Feb. 23, 1960 F. K. LUMPKIN 2,925,675
TRANSPARENT COVERED CERTIFICATE HOLDER
Filed Oct. 15, 1958 2 Sheets-Sheet 1
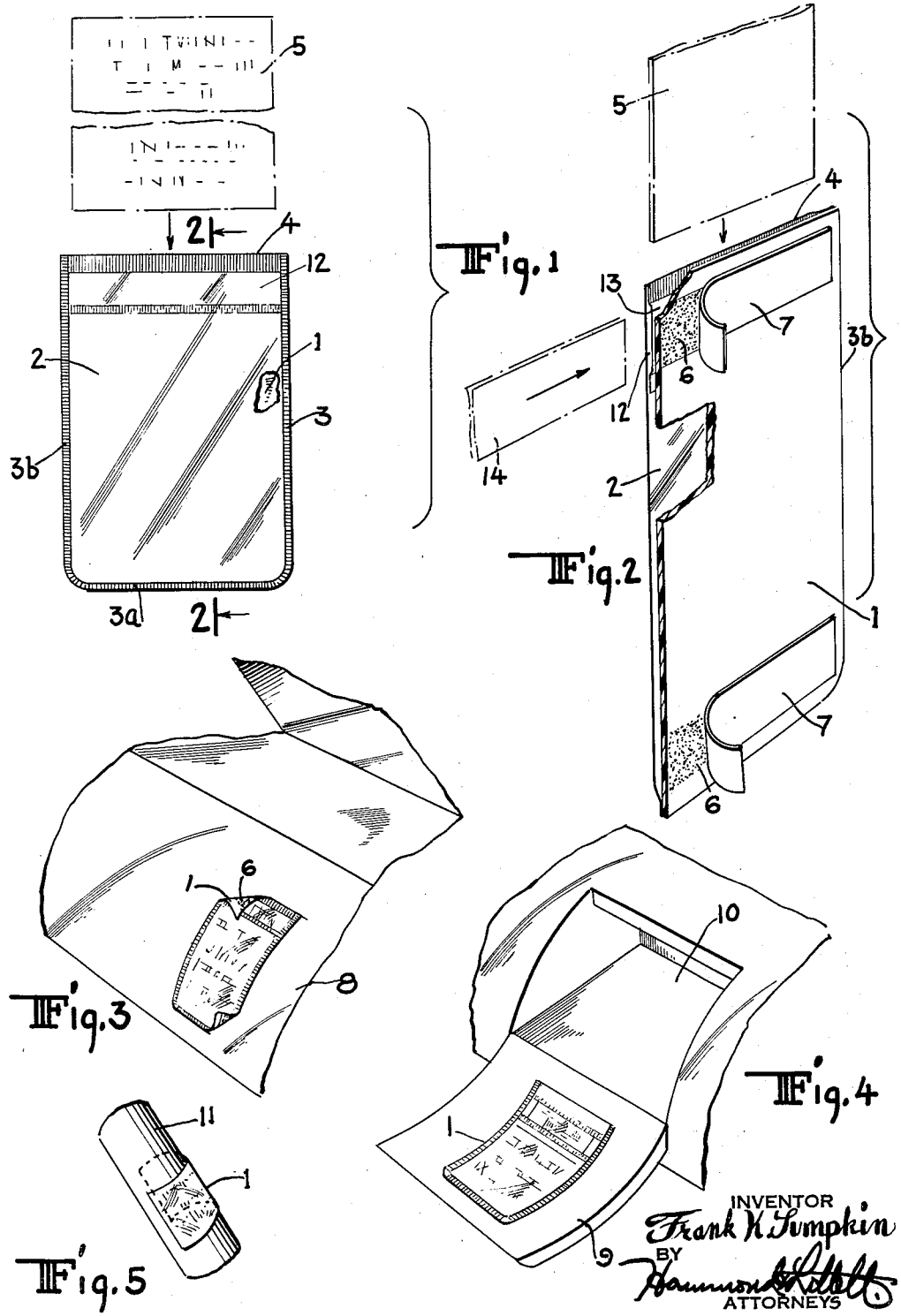

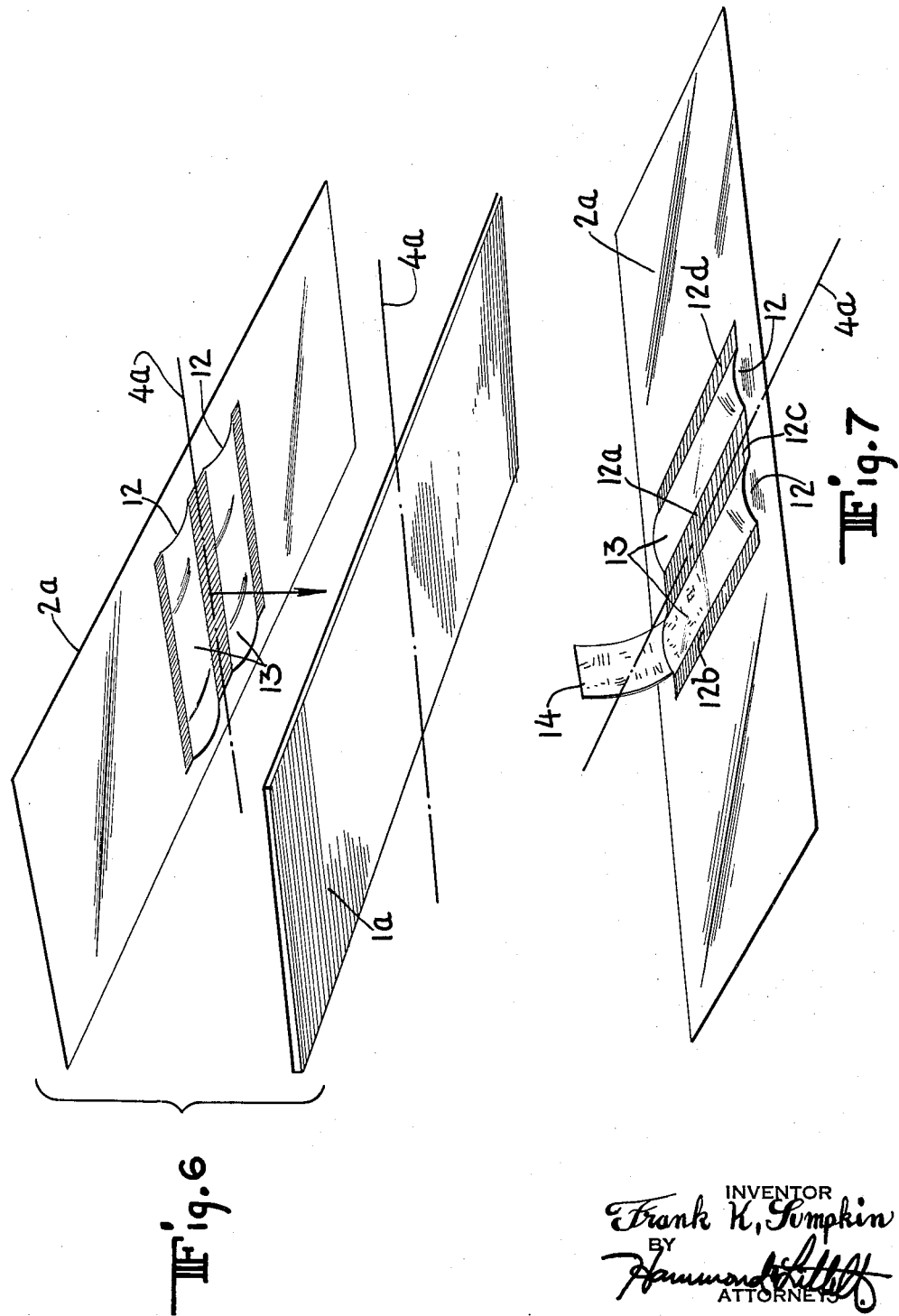

United States Patent Office 2,925,675
Patented Feb. 23, 1960

2,925,675

TRANSPARENT COVERED CERTIFICATE HOLDER

Frank K. Lumpkin, Zionsville, Ind.

Application October 15, 1958, Serial No. 767,355

2 Claims. (Cl. 40—10)

This invention relates to a new and useful improvement in transparent covered certificate holders and advertising display devices.

In many states the drivers of automobiles, trucks, taxi cabs and the like, are required to have on display and readily visible, driving licenses, certificates of insurance and the like. Many display devices for certificates of this kind have been suggested but most of them have the defect that they are expensive to manufacture and require special attachment devices for attachment to the automotive vehicle and cannot be readily removed after they have been attached to the vehicle.

It is an object of this invention to provide a certificate holder which may be easily and quickly attached to or detached from various portions of the vehicle and in which the certificate to be displayed is readily visible through a transparent cover through which the certificate is visible without removal from the display device.

Another object of the invention is to provide an inexpensive certificate display holder which carries adhesive strips on the back thereof whereby it may be readily and firmly attached to different portions of an automotive vehicle to hold the certificate to be displayed in position for ready examination.

Another object of the invention is to provide a transparent covered certificate holder and advertising novelty which can, if desired, be given away in connection with the advertisement of a particular business.

Various other objects and advantages of the invention will be apparent as this description proceeds.

Referring now to the drawings which show a preferred form of embodiment of the invention, Fig. 1 is a face view of my improved transparent covered certificate holder showing a certificate in position for insertion therein.

Fig. 2 is a sectional view substantially along the line 2—2 of Fig. 1 showing various portions of the certificate holder broken away.

Fig. 3 is a partial perspective view showing the certificate holder attached to the cowl or instrument panel of an automobile.

Fig. 4 is a view showing the certificate holder attached to the inside of the door of the glove compartment of an automobile.

Fig. 5 is a view showing the certificate holder attached to the steering column of an automotive vehicle.

Fig. 6 is an exploded view of two certificate holders in process of manufacture, and Fig. 7 is a view of the transparent section of two certificate holders in upside down position showing how the pockets for advertising material are formed thereon.

In the form of embodiment illustrated, the certificate holder consists of an opaque back portion of flexible vinyl plastic film 1 to which a front of transparent film of flexible plastic material, such as vinyl plastic, cellophane or the like 2 is attached by adhesive fusion and crimping around the three of the edges 3, 3a and 3b leaving the top edge 4 open to thereby form an envelope having an opaque flexible back portion 1 of vinyl plastic film and a transparent face 2 through which a certificate, license, insurance card or the like 5 is visible when inserted inside the envelope as indicated in Figs. 1 and 2. The back of the opaque portion 1 is provided with two strips of pressure sensitive adhesive 6 which are covered with a layer 7 of oil paper or the like to protect the strips of adhesive 6 until ready for application to the automobile. When it is desired to attach the certificate holder to any portion of an automotive vehicle or at any other place one or both of the strips of paper 7 is peeled away or removed to expose the pressure sensitive adhesive 6 and when the exposed adhesive strip or strips on the envelope is pressed against the portion of the vehicle to which it is to be attached, the adhesive sticks firmly to hold the certificate holder in place.

Fig. 3 illustrates the certificate holder 1 applied by the adhesive layers 6 to the front of instrument panel 8.

Fig. 4 shows the certificate holder 1 attached on the inside of the door 9 of the glove compartment 10, and Fig. 5 shows the certificate holder 1 attached to the steering column 11 of an automobile.

To provide an advertising display space in addition to the transparent certificate holder, a pocket 12 is formed on the back side of the transparent covering 2 by applying an additional layer of cellophane or other transparent material 13 to the back of the transparent covering 2 and inserting an advertising display card 14 into the pocket 12 before the transparent front 2 and opaque back 1 of the envelope are assembled together.

In manufacturing the display device illustrated in Figs. 1 and 2 an opaque back portion 1a of vinyl plastic film or the like of twice the length of the desired certificate display envelope and a transparent front portion 2a of twice the length of the desired envelope are cut as illustrated in Fig. 6 and brought together and secured around the edges by adhesion and crimping and the double envelope so formed is then cut along the line 4a to form the open tops of the envelope illustrated in Fig. 1 thereby forming two such certificate display envelopes in one manufacturing operation. Prior to assembling the transparent front on the opaque back portion two pockets 12 are formed, one on each side of the cut line 4a to provide pockets for the insertion of the advertising display card 14 and the top of the back portion 13 of the pockets 12 is extended to include the pocket for the next adjacent envelope formed in the process so that when cut along the line 4a the top 13 of the advertising display pocket 12 forms a reinforcement along the top of the transparent front portion 2 of the envelope to provide an edge of double thickness.

Fig. 7 illustrates the transparent portion 2a for two certificate display envelopes in upside down position to show how the advertising pockets 12 are formed. As illustrated, an extra section 12a of transparent cellophane is secured to the back portion of the strip 2a by adhesive, along the edges 12b, 12c and 12d thereby forming the pockets 12, which are open at each side. The intermediate section 12c of the advertising pocket material extends from one pocket 12 to the other pocket 12, and when, after assembly as described in connection with Fig. 6, the assembly is cut along the line 4a to separate the two certificate holders, the intermediate section 12c of the pocket material forms a reinforcement along the open edge of the transparent section 2.

The advertising inserts 14 are inserted in the pockets 12 before assembly of the front portion 2a with the back portion 1a so that when the edges of the assembly are secured together the open ends of the pockets 12 are adjacent the crimped edges 3 and 3b of the finished certificate holder. In this way the advertising inserts 14 are prevented from moving out of the pockets 12.

While my improved certificate holder has been illustrated and described as having advertising display pockets 12 therein, the advertising display pockets are omitted in one form of embodiment and a certificate holder formed with only a transparent front 2 without the advertising display pockets therein.

Various other modifications can be made from that described above, which are intended to be included in the scope of the claims appended hereto.

I claim:

1. A certificate holder comprising a back portion of opaque flexible plastic material, a front portion of transparent flexible plastic material secured to the back portion along three edges by adhesive fusion and crimping, the fourth edge remaining open and forming an envelope, a display pocket forming element secured to the inside of the transparent front portion and forming a pocket therewith, having its open ends inside the certificate holder and adjacent the crimped edges thereof whereby advertising material in said advertising display pocket is retained therein, strips of pressure sensitive adhesive secured to the back of the opaque portion and covered with protective paper whereby when the protective paper is stripped off the pressure sensitive adhesive may be applied to a part of an automotive vehicle to secure the certificate holder thereon.

2. A certificate holder comprising a back portion of opaque flexible plastic material, a front portion of transparent flexible plastic material sealed to the back portion along three edges, the fourth edge remaining open and forming an envelope, a display pocket forming element secured to the inside of the transparent front portion, and forming a pocket therewith, with open edges of said pocket adjacent the sealed portion of the certificate holder whereby advertising display material in said pocket is retained therein a section of the said display pocket being adhesively secured to the top of the transparent front portion to reinforce said portion, strips of pressure sensitive adhesive secured to the back of the opaque portion and covered with protective paper whereby when the protective paper is stripped off the pressure sensitive adhesive may be applied to a part of an automotive vehicle to secure the certificate holder thereon.

References Cited in the file of this patent

UNITED STATES PATENTS

| | | |
|---|---|---|
| 2,093,598 | Clark | Sept. 21, 1937 |
| 2,193,296 | Pienzak | Mar. 12, 1940 |
| 2,298,421 | Salfisberg | Oct. 13, 1942 |
| 2,411,368 | Dow | Nov. 19, 1946 |
| 2,725,913 | Horwin | Dec. 6, 1955 |